United States Patent [19]

Bernard, Jr.

[11] Patent Number: 4,521,644

[45] Date of Patent: Jun. 4, 1985

[54] METHOD OF ESTABLISHING COMMUNICATION

[75] Inventor: Samuel Bernard, Jr., Vadnais Heights, Minn.

[73] Assignee: Minnesota Mining and Manufacturing Company, St. Paul, Minn.

[21] Appl. No.: 525,301

[22] Filed: Aug. 22, 1983

[51] Int. Cl.³ .............................................. H04M 9/00
[52] U.S. Cl. .................................. 179/2 DP; 340/909; 340/924
[58] Field of Search .................. 179/2 R, 2 A, 2 AM, 179/2 AS, 2 DP, 5 P; 340/825.07, 825.08, 909, 924; 455/4, 5

[56] References Cited

U.S. PATENT DOCUMENTS

| | | |
|---|---|---|
| 3,675,196 | 7/1972 | Molloy et al. . |
| 3,828,307 | 8/1974 | Hungerford .......................... 340/909 |
| 3,868,640 | 2/1975 | Binnie et al. ........................ 179/2 AM |
| 4,076,961 | 2/1978 | Holsinger et al. ................. 179/2 DP |
| 4,110,743 | 8/1978 | Zahnd . |
| 4,419,666 | 12/1983 | Gurr et al. ....................... 340/825.08 |

Primary Examiner—Keith E. George
Attorney, Agent, or Firm—Donald M. Sell; James A. Smith; William D. Bauer

[57] ABSTRACT

A method of establishing communication between a first device (e.g. 12) in a first one (e.g. 22) of a plurality of groups (22, 32, 42 and 48) with a second device (e.g. 28) which is a selected one of a plurality of devices (e.g. 24, 26, and 28) and a second one (e.g. 32) of the plurality of groups (22, 32, 42 and 48). The method is utilizable in a communications system having a plurality of groups (22, 32, 42 and 48) and a plurality of devices (e.g. 24, 26 and 28) within at least one (e.g. 32) of the plurality of groups (22, 32, 42 and 48), where communication between the plurality of groups (22, 32, 42 and 48) is by a randomly addressable switching system (20), where each of the plurality of groups (22, 32, 42 and 48) has a unique address within the randomly addressable switching system (20), where each of the plurality of devices (e.g. 24, 26 and 28) within each of the plurality of groups (22, 32, 42 and 48) has a unique identification code within the dedicated line (18, 30, 40 and 46). The method consists of connecting (202) the first device to the switching system, addressing (204) the second group, responding (206) by all devices within the second group, addressing (210) the second device within the second group, disconnecting (212) all but the address device within the second group, and responding (216) by the second device to establish communication. Communication (218) between the first device and the second device may then commence.

9 Claims, 5 Drawing Figures

METHOD OF ESTABLISHING COMMUNICATION

BACKGROUND OF THE INVENTION

The present invention relates generally to communication between devices and more particularly to a method of establishing communication between such devices.

Various devices, significantly digital devices, need to communicate with other similar or dissimilar devices. The purpose of communication may be to transfer, exchange, load or read data between a first device and a second device. In order to communicate, a means of establishing a data link must be provided.

Two types of communication between plural devices have generally been utilized in the art. These two general types of communication are by way of dedicated line and by way of telephone dial-up.

With a dedicated line communication system a number of units or devices are connected to a single communication line (which may be comprised of two or more wires) dedicated for this purpose which is sometimes completed onto itself forming a "loop". Communication between the units can then be established by one unit sending a request over the lines which addresses a second unit with a unique code. The identified unit then answers with an acknowledge and data communication is established. Various schemes have been devised to determine which station, unit or device on the communication line or ring has control for the purpose of sending communication over the line. For the purpose of the present invention the mechanism for deciding which device has control is ignored.

With a telephone dial-up communication system each individual unit or device would have its own telephone line and a unique telephone number. One unit attempting to communicate with a second unit would connect itself to the telphone lines and dial the second unit's telephone number. The second unit would then answer the telephone line to establish communication. Typically, the second or answering unit would respond to the first unit by sending a tone on the telephone line immediately after answering to indicate to the first or originating unit that it is available for data transfer.

A device, called an Intersection Management System (IMS) which is an independent time base controller, is utilized at stoplighted intersections. This unit very accurately keeps track of time in order to properly sequence the traffic signals in order to optimize traffic flow between the through stoplighted intersections. Each IMS unit has a "program" which indicates precisely at what times the stoplight signals at that intersection are to be changed. From time-to-time this "program", really stoplight control data, needs to be changed or replaced. This may be due to a long-term improvement of the traffic flow algorithm or because of a special event, e.g. for locations near a stadium a sporting event, which would drastically changed the normal traffic flow patterns and necessitate a new "program" for those locations.

From time-to-time it is desired to be able to communicate with a particular IMS unit. The purpose of this communication may be to modify the program, to update the time base, or simply to "read" the program or status of the unit. Communication with a particular IMS unit can be accomplished by having personnel physically go to the intersection where each IMS is located and manually modify or retrieve this data. However, it is expensive and time consuming to have personnel physically go to each intersection at which an IMS is located.

Prior art techniques do not work very well in this environment. A dedicated line communication system becomes very expensive and cumbersome due to the number of and length of lines required to be strung or established between all of the IMS unit locations. A telephone dial-up communication system would be much more economical in terms of the connecting lines since the system could use existing telephone communication switching systems. However, it could be very expensive to have a separate telephone number for each IMS unit or each IMS unit location.

SUMMARY OF THE INVENTION

The present invention provides a method of establishing communication in a communication system having a plurality of groups and a plurality of devices within at least one of the plurality of groups. Connection between the plurality of devices within at least one of the plurality of groups is by a dedicated line. Communication between the plurality of groups is by randomly addressable switching system. Each of the plurality of groups has a unique address within the randomly addressed switching system. Each of the plurality of devices within each of the plurality of groups has a unique indentification code within the dedicated line. The method establishes communication between a first device in a first one of the plurality of groups with a second device which is a selected one of the plurality of devices and a second one of the plurality of groups. The method connects the first device to the randomly addressable switching system by way of the dedicated line within the first one of the plurality of groups. The method then group addresses the second one of the plurality of groups utilizing the unique address within the randomly addressed switching system. The method then provides group response to the first device by all of the plurality of devices within the second one of the plurality of groups. The method then device addresses the second device with its unique identification code within the dedicated line. The method then disconnects all of the plurality of devices within the second one of the plurality of groups except for the uniquely addressed second device. The method finally allows response by the second device to the first device so that communication may commence.

In a preferred embodiment, the method further includes a step following the group responding step of delaying further communication for a first predetermined time to insure that all the plurality of devices within the second one of the plurality of groups have had time to respond. In a preferred embodiment, the method further includes a step following the disconnecting step of delaying further communication for a second period of time to insure that all of the plurality of devices within the second one of the plurality of groups except for the uniquely addressed second device have had time to disconnect. In preferred embodiments, the randomly addressable switching system is a telephone system and wherein each dedicated line is a telephone extension line.

The present invention also provides a method of establishing communication between a first traffic control unit and a first one of a plurality of groups with a second traffic control device which is a selected one of a plurality of traffic control devices and a second one of the plurality of groups. The method is utilized in the environment of a traffic control communication system having a plurality of traffic control units located at individual intersections. The plurality of traffic control units being separated into a plurality of groups with a plurality of traffic control units within at least one of the plurality of groups. Communication between the plurality of groups is by way of a telephone switching system. Each of the plurality of groups has a unique telephone number. Each of the plurality of traffic control units within each of the plurality of groups has a unique identification code. The method provides connecting the first device to the telephone switching system. Group addressing the second one of the plurality of groups utilizing the unique telephone number is accomplished. All of the plurality of traffic control units within the second one of the plurality of groups then respond to the first traffic control unit. The method then addresses the second traffic control unit with its unique identification within the telephone extension line. The method then disconnects all of the plurality of traffic control units within the second one of the plurality of groups except for the uniquely addressed second traffic control unit. The method then has the second traffic control unit respond to the first traffic control unit so that communication may commence.

The present invention provides a method of establishing communication in a system having a combination of a dedicated line and a telephone dial-up communication system. Instead of a separate telephone number for each device or unit, several devices may be, although not required to be, connected by dedicated line to one telephone number. Essentially these devices become extensions on one telephone number (line). The present invention provides advantages of both the telephone switching system and the dedicated line communication system. The volume of telephone numbers is significantly diminished and the amount of dedicated line is significantly reduced.

However, a new method of establishing communication needed to be developed for this combination communication system. If the method of the present invention were not utilized when one telephone number was dialed several devices would answer and attempt to communicate with the originating device.

BRIEF DESCRIPTION OF THE DRAWINGS

The foregoing advantages, construction and operation of the present invention will become more readily apparent from the following description and accompanying drawings in which.

DETAILED DESCRIPTION OF THE PREFERED EMBODIMENTS

Figure 1:
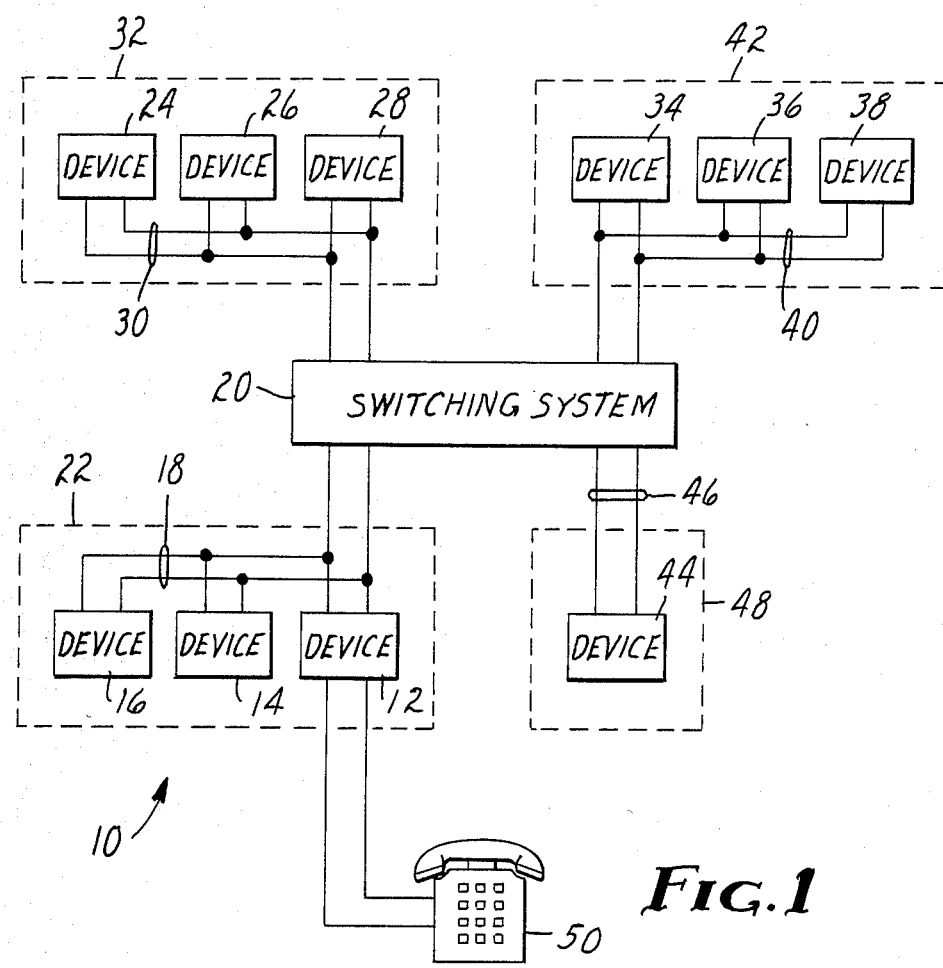
FIG. 1 is a block diagram of a switching system which provides the environment of the present invention.

FIG. 1 illustrates a combination communication system 10 which is neither a dedicated line communication system nor a telephone dial-up communication system. In the communication system 10 a plurality of communication devices of units are illustrated which may communicate with each other. Devices 12, 14 and 16 are connected by way of dedicated lines 18 to switching system 20. Devices 12, 14 and 16, being commonly connected with dedicated line 18, form a group 22 of devices. Similarly devices 24, 26 and 28 are connected together on dedicated line 30 and collectively connected to the switching system 20. Devices 24, 26 and 28 form group 32. Also, similarly devices 34, 36 and 38 are coupled together with dedicated line 40 and collectively connected to switching system 20. Devices 34, 36 and 38 form group 42. Device 44 is separately connected on its own dedicated line 46 to switching system 20. Device 44 forms its own group 48. According to the method of the present invention, any device in any single group may establish communications with any other device in another group. That is, device 12 in group 22, for example, could establish communication with device 28 in group 32. Device 12 would be connected to switching system 20 by way of dedicated line 18 and address group 32, in which device 28 is located. The switching system 20 would connect dedicated line 18 with dedicated line 30 serving all of the devices (devices 24, 26 and 28) in group 32. Devices 24, 26 and 28, all being connected by dedicated line 30 to switching system 20, would then answer and be connected to device 12. Device 12 would then particularly address device 28 and devices 24 and 26 would "hang-up" or disconnect from dedicated line 30. Device 28 would remain on dedicated line 20 and be connected by way of switching system 20 and dedicated line 18 directly to device 12 which may then commence to communicate directly with device 28. By similar techniques any single device in any one group may establish communications with any device in any other group. According to a preferred method of the present invention it is not possible for a device within one group to establish communication with a second device in its own group. For example, device 12 in group 22 could not establish communication with device 16, also in group 22. While device 12 may have within it the capacity of addressing switching system 20, in a preferred embodiment the switching system 20 is a telephone switching system and device 12 does not have dialing capability. In this environment a separate telephone 50 may be connected to device 12 to accomplish the dialing within switching system 20. The switching system 20, preferred to be a telephone switching system, can represent a single central telephone office or may collectively represent multiple telephone switching offices coupled together in the normal telephone switching manner.

While the present invention provides a method of establishing communications between one device, e.g. device 12, with a second device, e.g. device 28, in a different group, e.g. group 32, it is not necessary that the group in which the originating device is located have a plurality of devices. For example, the method of the present invention is explicitly designed to operate in a situation where device 44, being the only device in group 48, could communicate by way of dedicated line 46 through switching system 20 to address device 28 in group 32, for example.

Figures 2, 4:
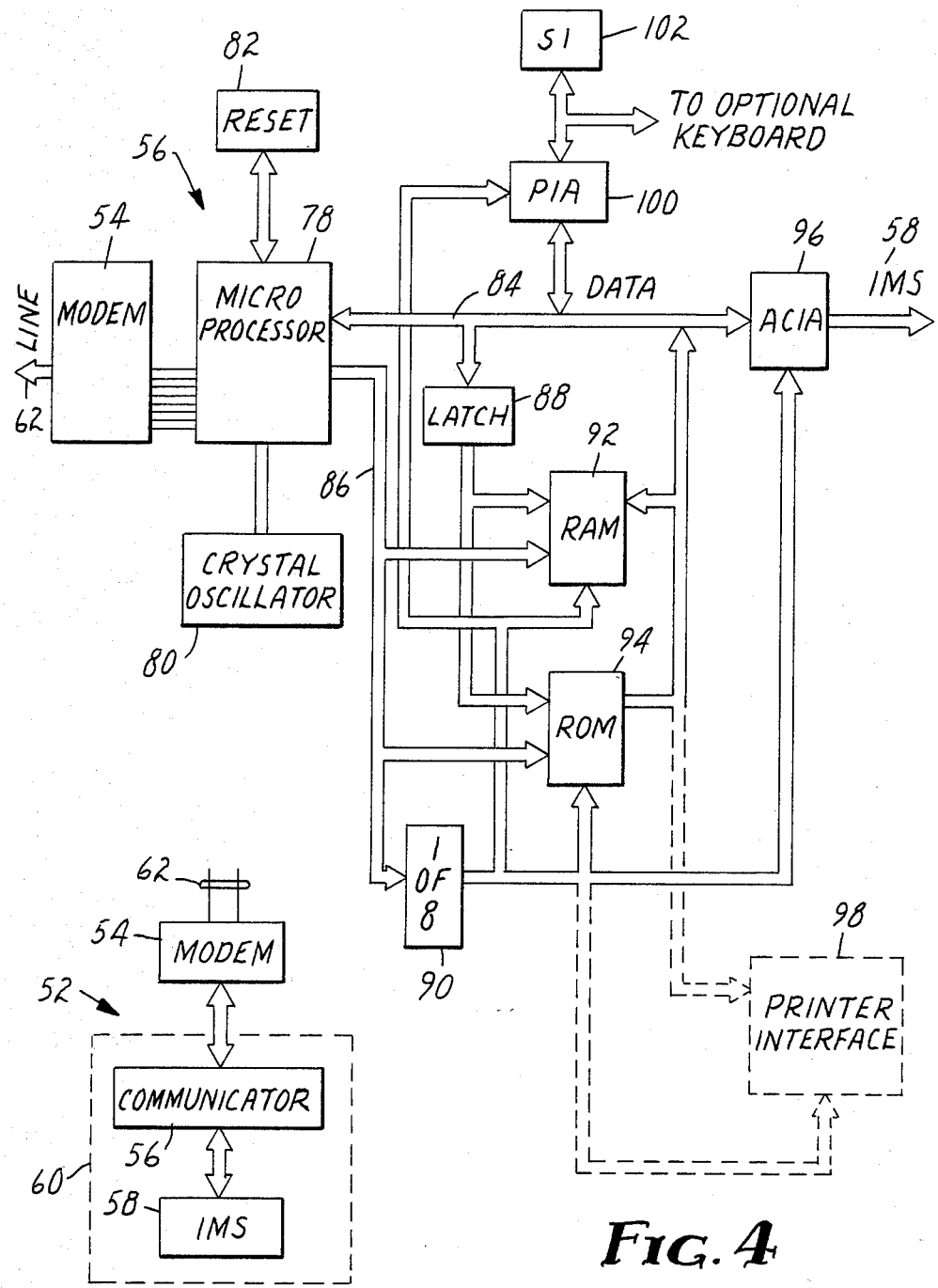
FIG. 2 is a block diagram of a preferred communication device.
FIG. 4 is a schematic diagram of the communicator portion of the device of FIG. 2.

FIG. 2 illustrates a preferred communication device to be utilized in the communication system 10 of FIG. 1. While the device 52 illustrated in FIG. 2 is a preferred communication device there could, of course, be many others. The device 52 illustrated in FIG. 2 is merely exemplary of a communication device which could be utilized with the method of the present invention. Device 52 consists of three main components, a modem 54, a communicator 56 and an IMS unit 58. In a generalized form communicator 56 in conjunction with IMS 58 could be considered a data communication device 60. The purpose of modem 54 is to interface between the communicator 56 and dedicated line 62. The purpose of communicator 56 is to coordinate asynchronous activities and establish the protocol for the establishment of communication according to the present invention. The purpose of IMS 58 is the actual data communication device from which or to which communication is to be accomplished.

For the purposes of the present invention, modem 54 may be any full duplex controllable modem. It is preferred that a full duplex modem utilizing a communication technique known as Bell 103 be utilized by a controlable modem. It is preferred that modem 54 provide signal lines to the communicator 56 which relate to the following functions: receive data, transmit data, dial out, originate mode, carrier detect, on hook and ring. The receive data and transmit data signals are self-explanatory and refer to the fact that data is available to be received or transmitted, respectively. The dial out signal indicates that this particular modem is dialing on the telephone switching system. Originate mode is a control signal which indicates that this modem is originating a communication. Carrier detect signal is available for the purpose of detecting a tone to be placed on the dedicated line upon the establishment of communications. The on hook signal indicates that the modem is "hung up" or disconnected from the switching system. The ring signal is a control signal which indicates that the switching system is ringing the particular line or telephone number to which the modem is responsive. An example of a preferred modem 54 is a Trendcom Direct Connect 300BPS modem which is manufactured OEM by Trend-Com Corporation, a subsidiary of Minnesota Mining and Manufacturing Company, St. Paul, Minn. This particular modem is available as the modem in a Trendcom Whisper Writer Printer, also manufactured by Minnesota Mining and Manufacturing Company, St. Paul, Minn. This particular modem is identified as board 103-1 (commercially available) in a Trendcom Whisper Writer printer. Although this is the preferred modem, any particular type of modem may be utilized for the purposes of the present invention dependent upon the requirements of the dedicated line and switching system to which the modem is connected.

IMS 58, or an intersection management system, is a very accurate time base controller. The IMS 58 is an example of a device to which any method of the present invention may connect. The Intersection Management System (IMS) is a commercially available unit manufactured by Minnesota Mining and Manufacturing Company, St. Paul, Minn.

Figure 3:
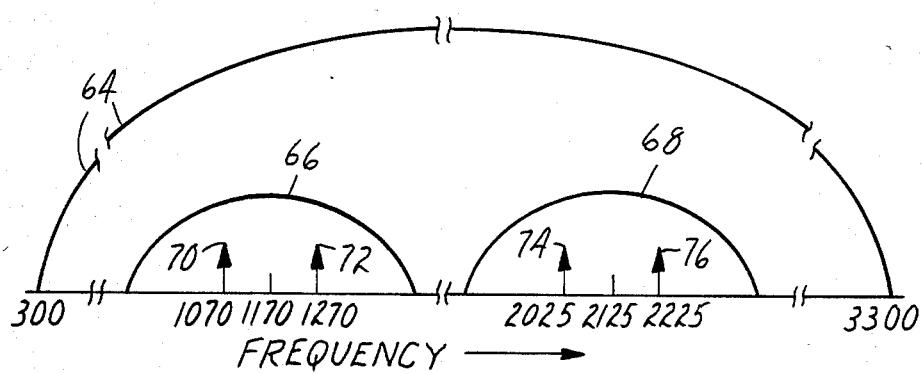
FIG. 3 illustrates a communication mechanism utilizing full duplex frequency shift keying.

FIG. 3 illustrates a preferred line communication scheme to be utilized on dedicated line 62 by modem 54. FIG. 3 illustrates the frequency aspects of a full duplex frequency shift keying mechanism, sometimes known as a Bell 103 system. Typically, the telephone line switching system will have a frequency spectrum of from 300 Hertz to 3300 Hertz. In the frequency shift keying system a signal in one direction is transmitted at a base frequency of 1170 Hertz (frequency spectrum 66) while a signal transmitted in the opposite direction is transmitted at a base frequency of 2125 Hertz (frequency spectrum 68). Within frequency spectrum 66 and frequency spectrum 68 frequency modulation is utilized. Frequency 1070 Hertz (reference numeral 70) is utilized to indicate a logical zero while frequency 1270 Hertz (reference numeral 72) is utilized to indicate a logical one. Similarly in frequency spectrum 68 frequency 2025 Hertz (reference numeral 74) is utilized to indicate a logical zero while frequency 2225 Hertz (reference numeral 76) is utilized to indicate a logical one. The frequency shift keying mechanism illustrated in FIG. 3 is a standard prior art frequency multiplexing communication scheme.

FIG. 4 illustrates a schematic diagram of the communicator module 56 and modem 54 illustrated in FIG. 2. Communicator module 56, in conjunction with modem 54, enables the method of establishing communication and the combination switching system illustrated in FIG. 1. Modem 54 connects directly to dedicated line 62 and also to microprocessor 78 of communicator 56. The time base of microprocessor 78 is controlled by crystal oscillator 80. Start-up, reset and power down considerations with respect to microprocessor 78 are controlled by special purpose reset circuitry 82. The contents of reset circuitry 82 is not pertinent to the present invention. Microprocessor 78 is controlled with a set of firmware, a preferred embodiment of which is attached to the patent application file and incorporated as part of and is part of the specifications of the present invention. Reference to this firmware listing details the particular procedures and sequences to be executed by microprocessor 78. This detailed firmware description listing contains all of the pertinent features of the method of the present invention which operates in conjunction with the hardware described. The detailed firmware listing may include portions which may not be particularly useful to the use of the present invention but which is useful in a preferred embodiment of the microprocessor routines embodying the present invention. Microprocessor 78 contains a combination address/data bus 84 and a supplementary address bus 86. Combination address/data bus 84 splits the address portion being delivered to latch 88 which in combination with one of eight decoder 90 demultiplexes the address provided by microprocessor 78 between RAM 92, ROM 94, asynchronous communications interface adapter 96 and optional printer interface 98. The data portion of combination address/data bus 84 is coupled to RAM 92, ROM 94, asynchronous communications interface adapter 96, printer interface 98 as well as periperal interface adapter 100. Asynchronous communication interface adapter 96 is connectable directly to IMS unit 58. Peripheral interface adapter 100 may be utilized to connect to an optional keyboard (not shown). Peripheral interface adapter 100 is also utilized to connect to a preset switch 102. Preset switch 102 can be modified manually and used to determine the unique identification code of the particular device within its own group. Microprocessor 78, through the firmware, may interrogate preset switch 102 to assertain the particular unique identification code associated with this particular communicator 56. Thus, each communicator 56 may have a unique identification code.

The particular components which may be utilized for the schematic diagram of FIG. 4 are illustrated in Table I.

TABLE I

| Reference Numeral | Item | Value or Type Number | Manufacturer |
| --- | --- | --- | --- |
| 78 | Microprocessor | 6803 | Motorola |
| 80 | Crystal Oscillator | 4 megahertz | NEL |
| 88 | Latch | 74LS363 | Texas Instruments |
| 90 | Decoder (1 of 8) | 74LS138 | Texas Instruments |
| 92 | RAM | 8416 | Fujitsu |
| 94 | ROM | 2732 | Intel |
| 96 | ACIA | 6850 | Motorola |
| 100 | PIA | 6820 | Motorola |

Figure 5:
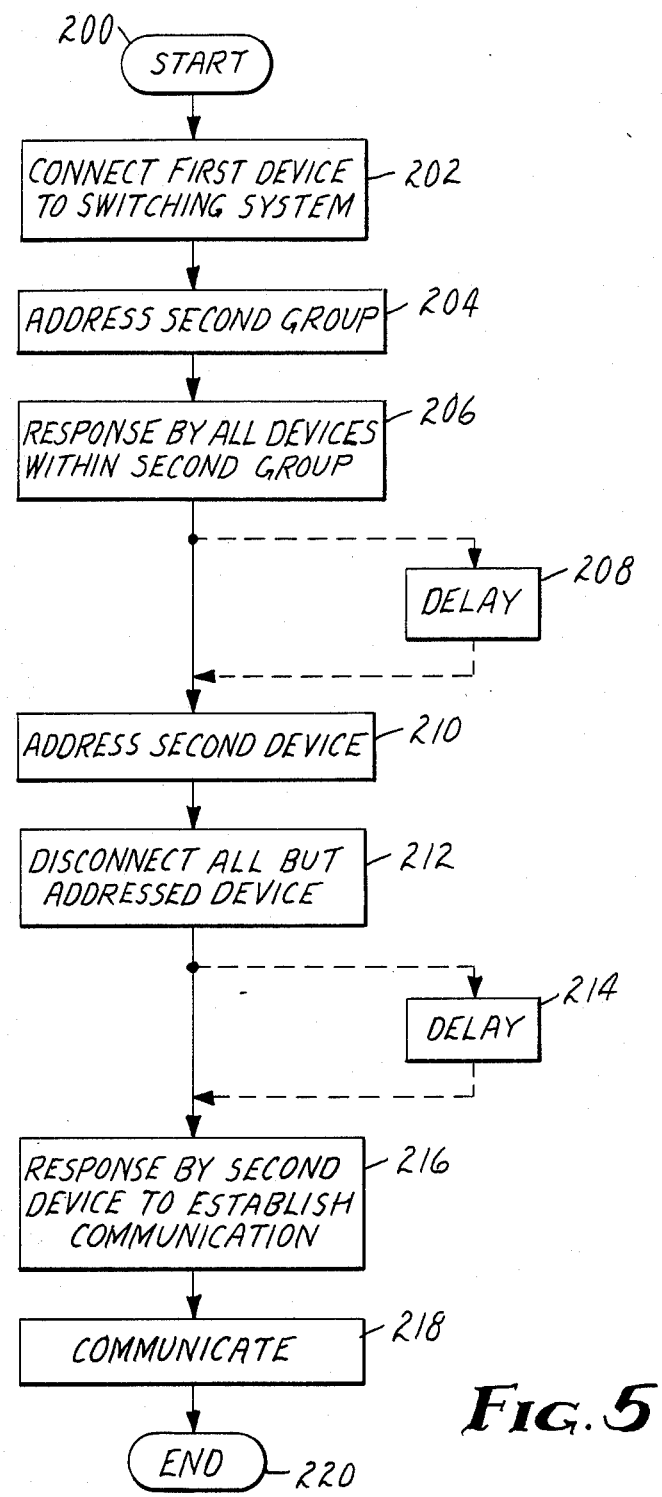
FIG. 5 is a flow diagram of the method of the present invention.

FIG. 5 illustrates a flow diagram showing the method of the present invention. The flow diagram begins with start block 200. The first step in the method is to connect 202 the first device or originating device to the switching system, e.g. a telephone switching system. The first device, either directly or through the use of a separate telephone, then addresses 204 the second group which contains the second device to which the first device is attempting to establish communication. In the preferred embodiment, the addressing tool for the second group would be accomplished by dialing the telephone number associated with the second group. The next step in the method is a response 206 by all the devices located within the second group. As the telephone number of the second group is dialed all of the devices connected to that telphone number, as line extensions of that telephone number, will answer and be, at least temporarily, connected through the telephone switching system to the originating device. Optionally, or as required by the detailed aspects of the particular switching system, the method may delay 208 further communications to allow time to insure that all of the devices within the second group have had an opportunity to answer and be connected. Once it has been established that all of the devices have been connected through the switching system the originating device then addresses 210 the particular second device within the second group to which the originating device is attempting to establish communication. To accomplish this the originating device then sends the particular unit identification code which is identified in each unit, as for example with preset switch 102 in FIG. 4. All devices within the second group which have not been uniquely addressed then disconnect 212 from the line. That is, all devices which have not been uniquely addressed then hang up and disconnect themselves from the telephone system. Optionally the method may then again delay 214 for another predetermined time to ensure that all of the nonuniquely addressed devices have ample opportunity to disconnect from the telephone line. The uniquely addressed second device then responds 216, typically with a tone, to the first device to indicate that it is ready to receive communications from the first device. Communication 218 may then commence and the method of the present invention is ended 220. Communication 218 may, of course occur in the conventional manner depending upon the particular devices communicating.

While described in terms of an intersection management system device, the present invention is useful to establish communications with many differing types of communication devices. The method of the present invention is not restricted to particular communication means although described with respect to the Bell 103 frequency shift keying system other communication techniques could easily be utilized.

Thus, it can be seen that there has been shown and described a novel method of establishing communication. It is to be understood, however, that various changes, modifications and substitutions in the form of the details of the present invention can be made by those skilled in the art without departing from the scope of the invention as defined by the following claims.

What is claimed is:

1. In a communication system having a plurality of groups and a plurality of devices within at least one of said plurality of groups, where said plurality of devices within said at least one of said plurality of groups are connected by a dedicated line, where communication between said plurality of groups is established by a randomly addressable switching system, where each of said plurality of groups has a unique address within said randomly addressable switching system, where each of said plurality of devices within each of said plurality of groups has a unique identification code within said dedicated line, a method of establishing communication between a first device in a first one of said plurality of groups with a second device which is a selected one of said plurality of devices in a second one of said plurality of groups, comprising:

connecting said first device to said randomly addressable switching system by way of said dedicated line within said first one of said pllurality of groups;

group addressing said second one of said plurality of groups;

connecting and group responding to said first device by all of said plurality of devices within said second one of said plurality of groups;

device addressing said second device with its unique identification code;

disconnecting all of said plurality of devices within said second one of said plurality of groups except for said second device; and device responding by said second device to said first device that communication may commence.

2. A method as in claim 1 which further includes a step following said group responding step, comprising delaying further communication for a first predetermined period of time to ensure that all of said plurality of devices within said second one of said plurality of groups have had time to respond.

3. A method as in claim 2 which further includes a step following said disconnecting step, comprising delaying further communication for a second predetermined period of time to ensure that all of said plurality of devices within said second one of said plurality of groups except for said uniquely addressed second device have had time to disconnect.

4. A method as in claim 1 wherein said randomly addressable switching system is a telphone system.

5. A method as in claim 4 wherein said dedicated line comprises a telephone extension line.

6. A method as in claim 1 wherein each of said plurality of devices comprises a digital storage and transmission device.

7. In a traffic control having a plurality of traffic control units located at individual intersections, said plurality of traffic control units being separated into a plurality of groups with a plurality of traffic control units within at least one of said plurality of groups, where connection between said plurality of groups is by way of a telephone switching system, where each of said plurality of groups has a unique telephone number, where each of said plurality of traffic control units within each of said plurality of grops has a unique identification code, a method of establishing communication between a first traffic control unit in a first one of said plurality of groups with a second traffic control unit which is a selected one of said plurality of traffic control unit in a second one of said plurality of groups, comprising:

connecting said first unit to said telephone switching system;

group addressing said second one of said plurality of groups utilizing said unique telephone number;

connecting and group responding to said first traffic control unit by all of said plurality of traffic control units within said second one of said plurality of groups;

unit addressing said second traffic control unit with its unique identification code;

disconnecting all of said plurality of traffic control units within said second one of said plurality of groups except for said second traffic control unit; and device responding by said second traffic control unit to said first traffic control unit that communication may commence.

8. A method as in claim 7 which further includes a step following said group addressing step, comprising delaying further communication for a first predetermined period of time to ensure that all of said plurality of traffic control units within said second one of said plurality of groups have had time to respond.

9. A method as in claim 8 which further includes a step following said disconnecting step, comprising delaying further communication for a second predetermined period of time to ensure that all of said plurality of traffic control units within said second one of said plurality of groups except for said uniquely addressed second traffic control unit have had time to disconnect.

* * * * *